Patented Aug. 11, 1925.

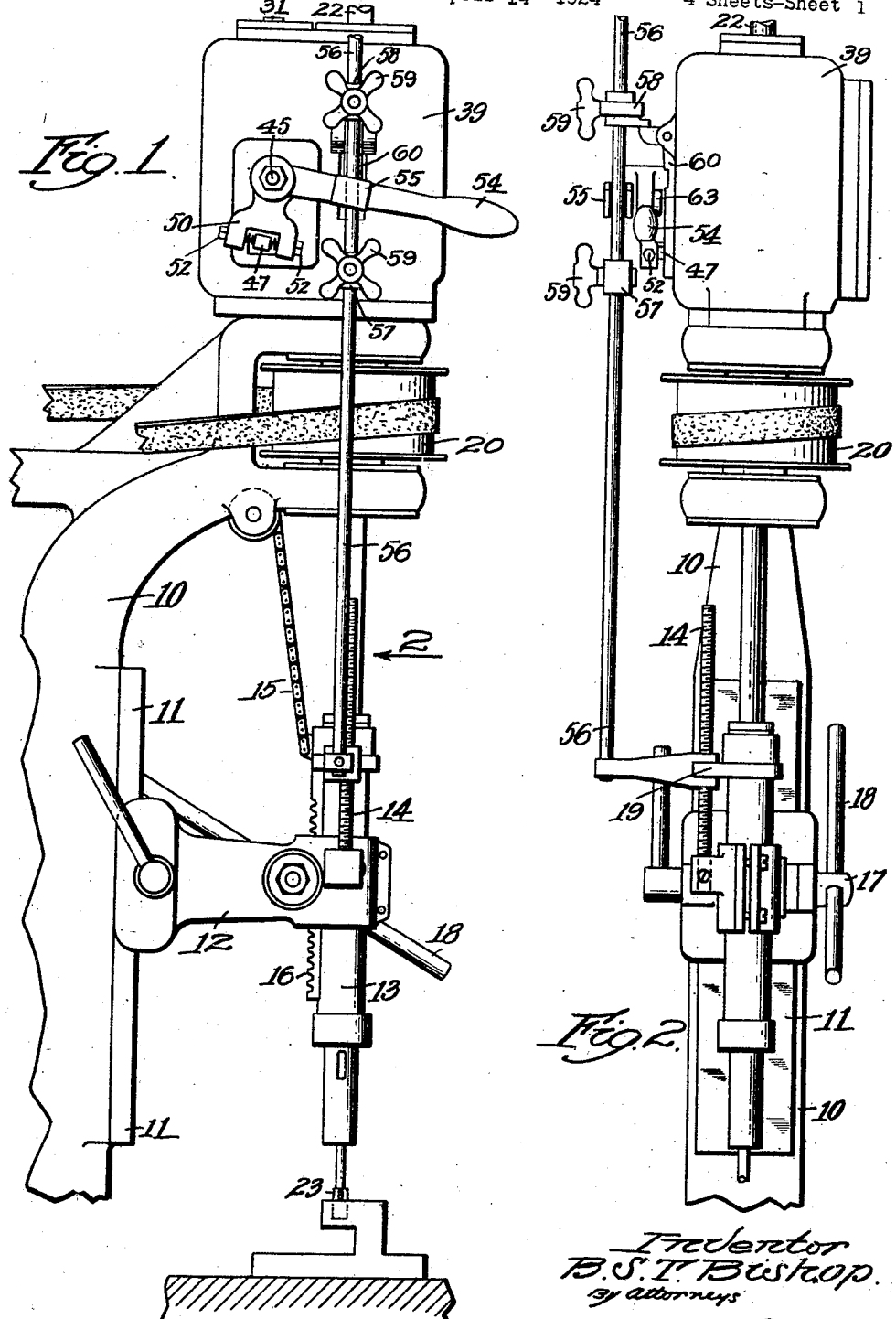

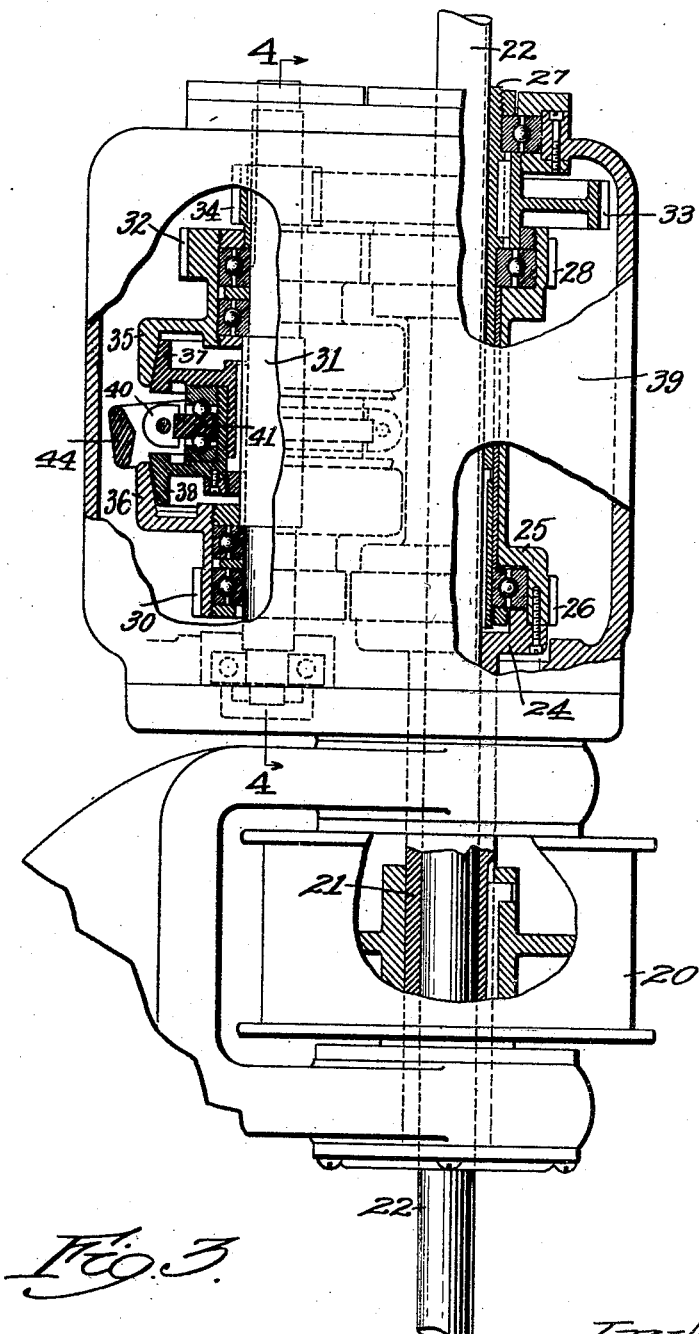

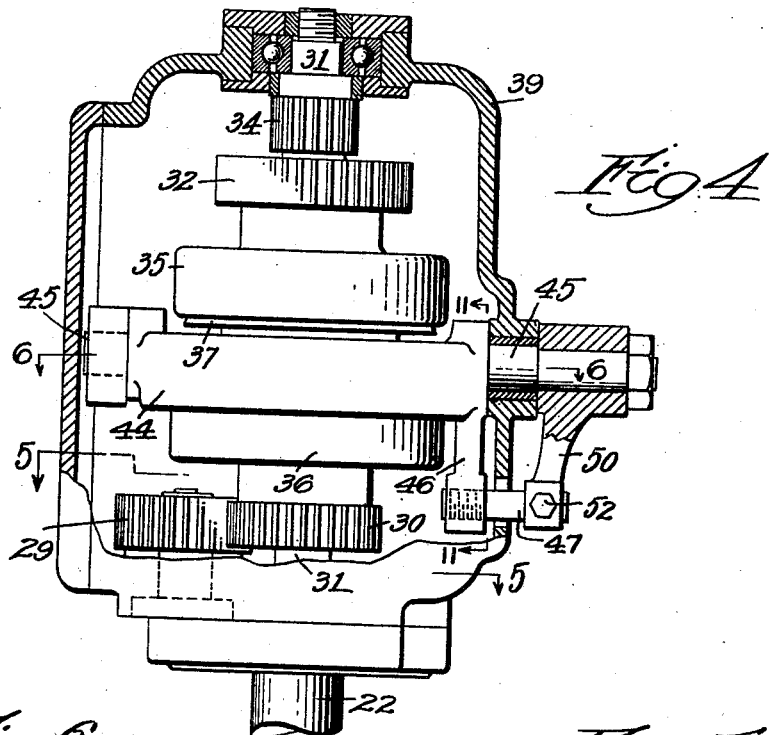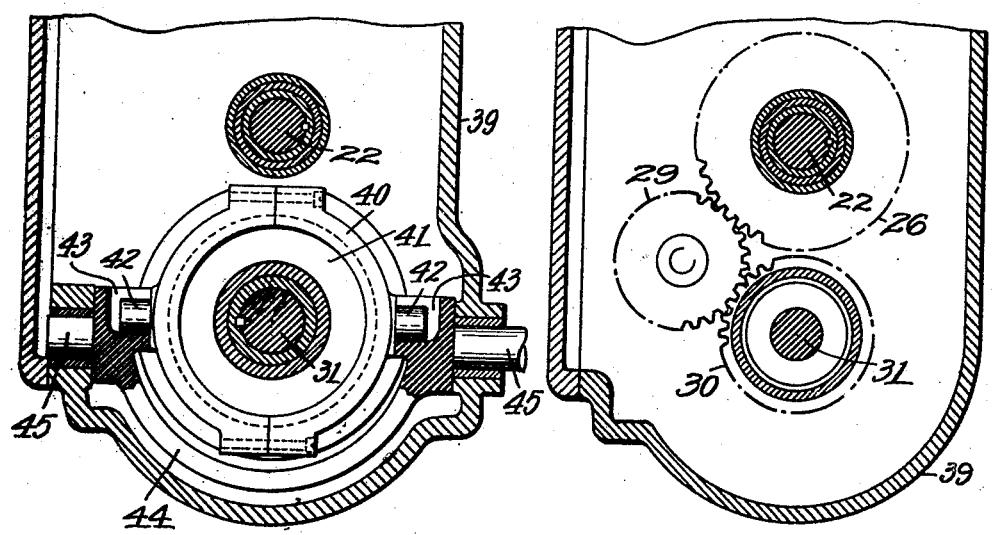

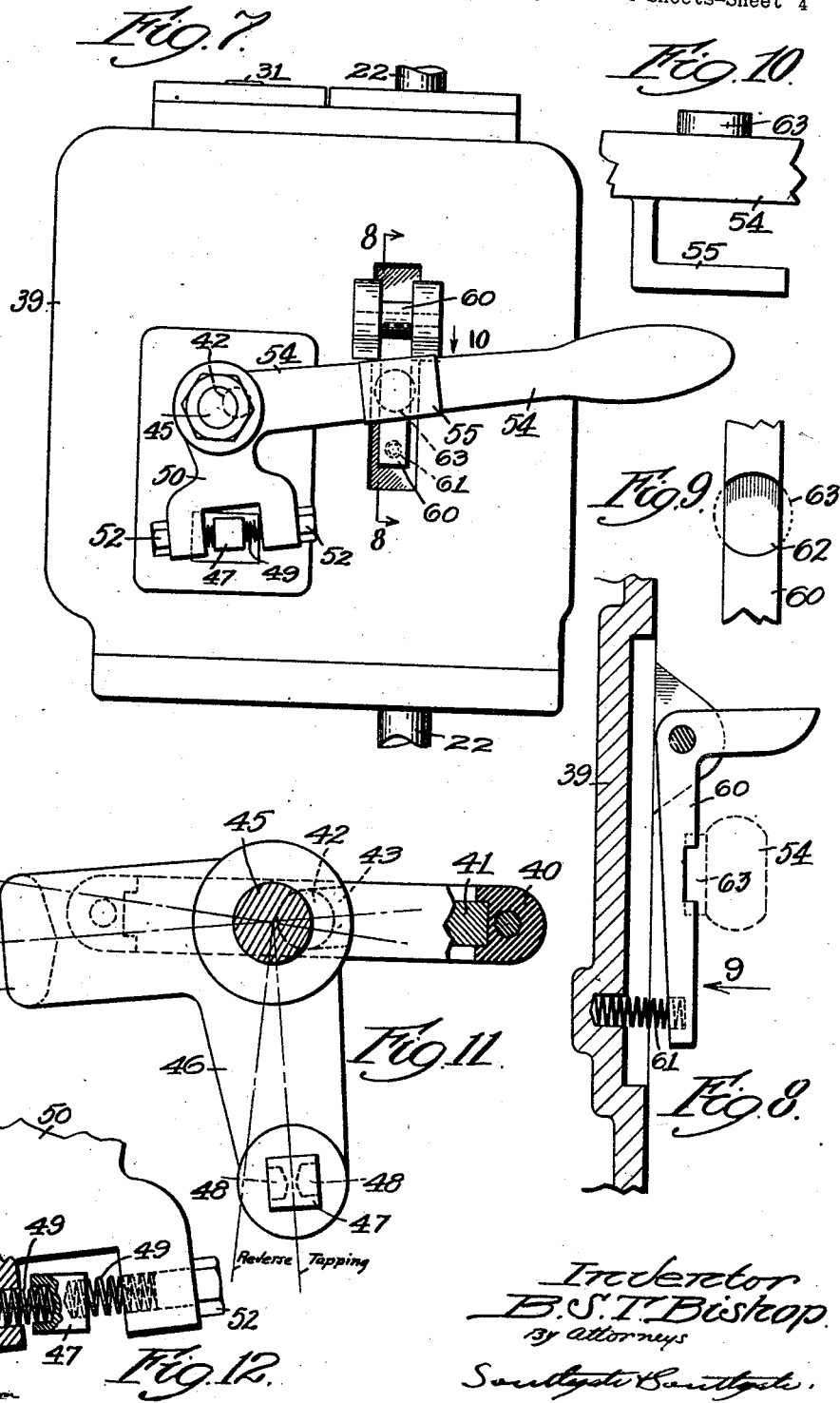

1,549,178

UNITED STATES PATENT OFFICE.

BENJAMIN S. T. BISHOP, OF WORCESTER, MASSACHUSETTS, ASSIGNOR TO LELAND-GIFFORD COMPANY, OF WORCESTER, MASSACHUSETTS, A CORPORATION OF MASSACHUSETTS.

TAPPING MACHINE.

Application filed April 14, 1924. Serial No. 706,283.

*To all whom it may concern:*

Be it known that I, BENJAMIN S. T. BISHOP, a citizen of the United States, residing at Worcester, in the county of Worcester and State of Massachusetts, have invented a new and useful Tapping Machine, of which the following is a specification.

The principal objects of this invention are to provide a compact and rapid forward and reverse driving mechanism; to provide means for operating the clutch for connecting the spindle to rotate either forward or in reverse that will not occupy much space, will be easy to operate, and can be assembled compactly with the driving and reversing mechanism itself; and to provide a simple trip mechanism for holding the operating handle up in tapping position adapted to be tripped by the movement of the spindle so as to release the handle and suitable connections therewith for automatically setting the parts so that after starting to go ahead and move the tap forward the mechanism will turn it until the tap descends to a certain point and then will reverse it automatically.

Reference is to be had to the accompanying drawings, in which—

Fig. 1 is a side view of a tapping machine constructed in accordance with this invention;

Fig. 2 is a front view thereof;

Fig. 3 is a side view on an enlarged scale partly in central section to show interior construction;

Fig. 4 is a front view with the casing in section on the line 4—4 of Fig. 3 so as to show the interior mechanism in elevation;

Figs. 5 and 6 are horizontal sectional views on the lines 5—5 and 6—6 respectively of Fig. 4;

Fig. 7 is a side view of the casing and reversing connections with the trip rod removed;

Fig. 8 is a transverse sectional view of one wall of the casing on the line 8—8 of Fig. 7;

Fig. 9 is a front view of a part of the trip;

Fig. 10 is a plan of a part of the handle enlarged;

Fig. 11 is a front view of the yoke and shoe for controlling the clutch, partly in section; and Fig. 12 is a side view of the lower end of the operating handle and connected parts partly in section.

I have shown the invention as applied to a well known type of tapping and drilling machine comprising a frame 10 on which are vertical ways 11 up and down which an arm 12 can be adjusted. This arm is provided with a central vertical passage for the usual quill 13. It is also shown as provided with a stop motion screw 14 for use when employing the device as a drill. The stop nuts used with this screw are not shown as they are not used when tapping. This screw passes freely through a hole in a bracket 19 on the quill for supporting the trip rod 56. A chain 15 is shown connected with a counterweight, not shown, for supporting the rack 16 which is connected with the quill for raising and lowering it. The arm 12 is provided with a shaft 17 having a pinion thereon, not shown, for meshing with the rack 16 and raising and lowering it. This is operated by a metal bar 18 as is well understood in this art.

The power is received through a pulley 20 which is keyed on a second quill 21 mounted to rotate freely on the spindle 22 which moves up and down with the lower quill 13. The tapping tool 23 is supported on the bottom of the spindle in the usual way and a drill or other tool can be substituted for it for other operations.

The quill 21 extends up to form the bottom 24 of an upper casing which is completed by an upper part 25 detachably fixed thereto and rotatable therewith. On this are two external gears 26 and 28 both rotatable positively with the pulley 20 and quill 21.

The quill is supported around the tool spindle 22 by ball bearings preferably. The lower gear 26 drives an intermediate gear 29 and through that a gear 30 loose on the back shaft 31 parallel with the spindle. The gear 28 meshes directly with a gear 32 also loose on the back shaft 31. Keyed on the spindle 22 beyond the quill 21 is a bushing 27 on which is keyed a gear 33 meshing directly with a gear or pinion 34 keyed to the back shaft 31. The two gears 30 and 32 are provided with opposite clutch faces 35 and 36 shown here as of conical shape for receiving two opposite clutch members 37 and 38 which are slidingly keyed on the back shaft. These gears 30 and 32 are mounted on ball bearings preferably. It will be seen that the two clutch members 37 and 38 being connected to move up and down together along the axis of the back shaft will clutch either of the gears 30 or 32 to the back shaft and cause that shaft to be rotated in either direction in accordance with the position of the clutch to turn the spindle either way. This gearing is located in a stationary casing 39.

Between these clutch members 37 and 38 is located a shoe 40. This is of circular shape surrounding the back shaft and connected with the ball bearing through an annular plate 41 constituting part thereof so that its position will control the position of the clutch members 37 and 38. The shoe is provided with a pair of opposite studs 42 which rest in radial recesses 43 in a pivoted yoke 44. These recesses have flat bottom surfaces on which the studs rest and they extend back far enough to allow these studs to be held up against their inner faces at a short distance from the center. The yoke in which these recesses are formed is of a semi-circular shape and is provided with a pair of studs 45 diametrically opposite each other but offset back of the studs 42. That is, their centers are out of alignment with the centers of the latter studs. These studs 45 are carried in fixed bearings in the casing and one of them extends through its side. The yoke has an arm 46 extending downwardly and adapted to be swung back and forth as will appear. The movement of this arm back and forth, swinging the yoke about the center of the studs 45 will raise and lower the studs 42 as will be obvious. This has the effect of raising and lowering the shoe 40 and therefore the clutch members 37 and 38.

The arm 46 has on the end a projection 47 shown as square and having two opposite recesses 48. Into these recesses project two springs 49 held in a bifurcated arm 50 which is pivoted on one stud 45 and is provided with screws 52 for adjusting the resistance of the springs 49. The arm 50 is a part of an operating hand lever 54 which swings on the stud 45. This hand lever is provided with a projection having a plate 55 parallel to the handle but spaced therefrom and open at the end. Up through the space between this plate and the handle extends the trip rod 56 which is arranged vertically and connected with the quill 13, as stated, so as to move up and down with it. Near the top this trip rod is provided with two stops 57 and 58, each adapted to be adjusted on the rod by hand screws 59 thereon. On the side of the casing adjacent these parts is provided a pivoted trip 60 having a substantially horizontal projection that is adapted to be engaged by the upper stop 58 when it comes down. In its normal position this trip is held out by a spring 61 and it is provided with a recess 62 which has curved upper and lower surfaces for receiving a part of a circular projection 63 on the lever 54 as shown in Fig. 8.

When it is desired to operate the device for tapping, the parts are adjusted properly and then the lever 54 is raised and its projection 63 located in the depression 62. This moves the arm 50 of the lever 54 to the right in Figs. 7 and 11 and moves the projection 47 over in the same direction. The result of this is to raise the studs 42 and consequently raise the clutch members 37 and 38 so as to bring the former into clutching position relative to the clutch surface 35. This causes the constantly rotating gear 32 to be clutched to the back shaft 31 and the spindle 22 to be rotated with it of course. The tool is fed down and performs the tapping operation by manual operation of the operating bar 18. As the tool moves down of course the trip rod 56 moves with it and when it reaches the point for which it is adjusted the stop 58 engages the trip 60 and swings it in opposition to the spring 61 so as to remove the recess 62 from engagement with the projection 63. This allows the lever 54 to drop by gravity and swings the arm 50 over to the left in Fig. 7. The result of this is to swing the yoke 44 in that direction and lower the trunnions 42. This immediately causes the clutch to reverse and the power is then applied to the spindle 22 through the back shaft and gears 26 and 30 so that the spindle itself rotates in the reverse direction to draw the tap out of the work. Then the operator raises the quill 13. When this occurs the trip rod 56 rises until the stop 57 engages the bottom of the lever 54 and raises it through neutral position to that shown in Fig. 8. Then the tap will rotate forwardly again.

This provides a construction in which the reversal is easily and quickly accomplished without the provision of an especially complicated mechanism for securing this result. The reversing mechanism is all mounted practically in a comparatively small casing.

Although I have illustrated and described only a single form of the invention I am aware of the fact that modifications can be made therein by any person skilled in the art without departing from the scope of the invention as expressed in the claims. Therefore I do not wish to be limited to all the details of construction herein shown and described or to the particular type of tapping machine illustrated but what I do claim is:—

1. In a tapping machine, the combination with a shaft or quill for receiving power and a spindle on which the tapping tool is adapted to be mounted, of a back shaft, reversing mechanism for driving the back shaft in either direction from the quill, a controlling lever for operating the reversing mechanism, a trip adapted to hold the lever up in position to drive the spindle forward, a trip rod movable up and down with the spindle, stops on the trip rod, one of said stops being adapted to engage the lever and raise it for the purpose of stopping the feed after drawing out the tap, said trip being provided with a spring for yieldingly forcing it into position to hold the lever in tapping position when it once moves into that position and the trip having a projection adapted to be engaged by the other stop to move in into a position to allow the lever to drop and reverse the direction of rotation.

2. In a tapping machine, the combination of a quill connected with the power to rotate constantly, a tool spindle extending centrally through the quill and adapted to be fed independently thereof by hand, a back shaft geared to the spindle to rotate it, a reversing mechanism comprising two clutch members connected with said quill to be rotated constantly thereby in opposite directions, a clutch member slidingly keyed to the back shaft and capable of driving the back shaft from either of said first mentioned clutch members, a trip rod movable with the spindle, and means adapted to be operated by the trip rod for changing the setting of the slidable clutch member to reverse the direction of rotation of the spindle.

3. In a tapping machine, the combination of a quill, means for driving the quill constantly, a tapping spindle slidably mounted in the quill and rotatable independently thereof, a back shaft, means for rotating the spindle from the back shaft, reversing mechanism for driving the back shaft in either direction from the quill, said reversing mechanism comprising an annular plate adapted to be raised or lowered, a shoe connected with said plate, a pivoted yoke having recesses at a distance from its center of oscillation in which said shoe is supported, whereby a slight swinging of the yoke about its center will raise or lower the shoe and change the direction of rotation of the spindle.

4. In a tapping machine, the combination of a quill, means for driving the quill constantly, a tapping spindle slidable mounted in the quill and rotatable independently thereof, a casing in which the upper part of the quill is located, a back shaft in the casing parallel with the quill, means for rotating the spindle from the back shaft, reversing mechanism in said casing for driving the back shaft in either direction from the quill, said reversing mechanism comprising an annular plate, a shoe carrying said plate and extending around the back shaft, a yoke pivoted in the casing and having radial recesses at a slight distance from its center of oscillation in which said shoe is supported, whereby slight swinging of the yoke about its center will raise or lower the shoe and change the direction of rotation of the spindle.

5. In a tapping machine, the combination of a quill constituting the power receiving shaft of the machine, a tapping spindle, a back shaft geared to rotate the spindle, a reversing mechanism on the back shaft for driving the back shaft in either direction from the quill, said reversing mechanism comprising a shoe adapted to be moved to change the direction of rotation of the back shaft and provided with a pair of studs, a yoke having a pair of studs on which it is supported to turn, the yoke having recesses for receiving the studs of the shoe at a distance from the center of oscillation of the yoke, the yoke having an arm extending therefrom, and an operating lever pivoted on the same axis as the yoke and having an arm connected with the arm on the yoke, whereby the operating lever can be moved to swing the yoke in either direction.

6. In a tapping machine, the combination of a quill constituting the power receiving shaft of the machine, a tapping spindle, a back shaft, gears for rotating the spindle from the back shaft, a reversing mechanism for driving the back shaft in either direction from the quill comprising a shoe provided with a pair of opposite studs, a semicircular yoke having a pair of opposite studs on which it is supported to turn, said studs being out of alignment with the studs on the shoe, the yoke having flat bottom recesses for receiving the studs of the shoe at a distance from the center of oscillation of the yoke, the yoke having an arm extending therefrom, an operating lever pivoted on the same axis as the yoke and having an arm yieldingly connected with the arm on the yoke, whereby the operating lever can be moved to swing the yoke in either direction with a yielding resistance, said operating lever being adapted by its own weight to swing the yoke into a position to reverse the direction of rotation of the spindle and draw out a tap located thereon.

7. In a tapping machine, the combination of a quill constituting the power receiving shaft of the machine, a tapping spindle, a back shaft, gears for rotating the spindle from the back shaft, a reversing mechanism for driving the back shaft in either direction from the quill comprising a shoe, a yoke supported to turn, the yoke having an arm extending therefrom, an operating lever having an arm yieldingly connected with the arm on the yoke, whereby the operating lever can be moved to swing the yoke in either direction with a yielding resistance, said operating lever being adapted by its own weight to swing the yoke into a position to reverse the direction of rotation of the spindle and draw out a tap located thereon.

8. In a tapping machine, the combination with a shaft or quill for receiving power and a spindle on which the tapping tool is adapted to be mounted, of a back shaft geared positively to the spindle, reversing mechanism for driving the back shaft in either direction from the quill, a controlling lever for operating the reversing mechanism arranged to hold it in reverse position by gravity, a trip having a recess therein, said lever having a projection adapted to fit in said recess to hold the handle up in position to drive the spindle forward, a trip rod movable up and down with the spindle, manually controlled means for moving the spindle up and down, stops adjustably located adjacent on the trip rod, one of said stops being adapted to engage the trip and drop the lever for the purpose of reversing the feed and drawing out the tap.

9. In a tapping machine, the combination with a shaft or quill for receiving power and a spindle on which the tapping tool is adapted to be mounted, of a back shaft geared positively to the spindle, reversing mechanism for driving the back shaft in either direction from the quill, a controlling lever for operating the reversing mechanism arranged to hold it in reverse position by gravity, a trip having a recess therein, said lever having a projection adapted to fit in said recess to hold the lever up in position to drive the spindle forward, a trip rod movable up and down with the spindle, manually controlled means for moving the spindle up and down, stops adjustably located on the trip rod, one of said stops being adapted to engage the lever and raise it for the purpose of stopping the feed after drawing out the tap, said trip being provided with a spring for yieldingly forcing it into position to hold the lever in tapping position when it once moves into that position and the trip having a projection adapted to be engaged by the other stop to move it into a position to allow the lever to drop and reverse the direction of rotation.

10. In a tapping machine, the combination with a back shaft, reversing mechanism for driving the back shaft in either direction, a controlling lever for operating the reversing mechanism arranged to hold it in reverse position by gravity, a trip having a recess therein, said lever having a projection adapted to fit in said recess to hold the lever up in position to drive the spindle forward, a trip rod movable up and down with the spindle, stops located on the trip rod, one of said stops being adapted to engage the lever and raise it for the purpose of stopping the feed after drawing out the tap, said trip being provided with a spring for yieldingly forcing it into position to hold the lever in tapping position when it once moves into that position and the trip having a projection adapted to be engaged by the other stop to move it into a position to allow the lever to drop and reverse the direction of rotation.

11. In a tapping machine, the combination with a spindle for holding the tap, of reversing mechanism therefor, a controlling lever connected to control the reversing mechanism, a trip having means for holding the lever in position to drive the spindle forward, means for holding the trip in that position, and a trip rod having stops and movable longitudinally with the spindle, one stop being in position to engage the trip to reverse the direction of rotation and the other to engage the lever and move it to a position to drive the spindle forward.

12. In a tapping machine, the combination with a back shaft, reversing mechanism for driving the back shaft in either direction, a controlling lever for operating the reversing mechanism, a trip adapted to hold the lever up in position to drive the spindle forward, a trip rod movable up and down with the spindle, stops located on the trip rod, one of said stops being located and adapted to engage the lever and raise it for the purpose of stopping the feed after drawing out the tap, said trip being provided with a spring for yieldingly forcing it into position to hold the lever in tapping position when it once moves into that position and the trip having a projection located and adapted to be engaged by the other stop to move it into a position to allow the lever to drop and reverse the direction of rotation.

In testimony whereof I have hereunto affixed my signature.

BENJAMIN S. T. BISHOP.